United States Patent
Olszewski et al.

(10) Patent No.: US 10,591,677 B2
(45) Date of Patent: Mar. 17, 2020

(54) RETROFIT COVER FOR FIBER OPTIC CABLE CONNECTION

(71) Applicant: Preformed Line Products Co., Mayfield Village, OH (US)

(72) Inventors: Jonathon Randall Olszewski, Elyria, OH (US); John Lewis Hornsby, Ravenna, OH (US); Benjamin Franklin Ciesielczyk, North Lawrence, OH (US)

(73) Assignee: Preformed Line Products, Co., Mayfield Village, OH (US)

( * ) Notice: Subject to any disclaimer, the term of this patent is extended or adjusted under 35 U.S.C. 154(b) by 0 days.

(21) Appl. No.: 15/454,038

(22) Filed: Mar. 9, 2017

(65) Prior Publication Data

US 2017/0261695 A1    Sep. 14, 2017

Related U.S. Application Data

(60) Provisional application No. 62/305,772, filed on Mar. 9, 2016.

(51) Int. Cl.
*G02B 6/38* (2006.01)

(52) U.S. Cl.
CPC ........... *G02B 6/3849* (2013.01); *G02B 6/387* (2013.01); *G02B 6/3816* (2013.01)

(58) Field of Classification Search
CPC ..... G02B 6/3816; G02B 6/3849; G02B 6/387
See application file for complete search history.

(56) References Cited

U.S. PATENT DOCUMENTS

| 2009/0269011 | A1* | 10/2009 | Scadden | G02B 6/3817 385/65 |
| 2014/0041212 | A1 | 2/2014 | Penumatcha et al. | |
| 2014/0133823 | A1* | 5/2014 | Simmons | G02B 6/4248 385/137 |
| 2017/0212312 | A1* | 7/2017 | Tong | G02B 6/3885 |

FOREIGN PATENT DOCUMENTS

| CN | 2392188 Y | 8/2000 |
| EP | 1172673 A2 | 1/2016 |
| WO | 2016005879 A1 | 1/2016 |

OTHER PUBLICATIONS

Int. Search Report/WrittenOpinion cited in PCT Application No. PCT/US2017/021493 dated May 12, 2017, 14 pgs.

\* cited by examiner

*Primary Examiner* — Thomas A Hollweg
*Assistant Examiner* — Erin D Chiem
(74) *Attorney, Agent, or Firm* — Cooper Legal Group, LLC

(57) ABSTRACT

A cover for a fiber optic cable connection includes a cap portion having a first housing portion having a first housing wall, a second housing portion having a second housing wall, and a coupler portion that couples the first housing portion and the second housing portion in a closed position. The first housing wall and the second housing wall define a housing opening. A sealing assembly is received within the housing opening and has an inner surface and an outer surface. The inner surface defines a sealing opening that receives a fiber optic cable. The outer surface contacts at least one of the first housing wall or the second housing wall when the sealing assembly is received within the housing opening. The sealing assembly creates an additional seal when the first housing wall and the second housing wall compress the sealing assembly onto a union portion.

20 Claims, 7 Drawing Sheets

RETROFIT COVER FOR FIBER OPTIC CABLE CONNECTION

CROSS-REFERENCE TO RELATED APPLICATIONS

This application claims priority to U.S. Provisional Patent Application No. 62/305,772, filed Mar. 9, 2016, which is incorporated herein by reference.

TECHNICAL FIELD

The instant application is directed towards a cover. For example, the instant application is directed towards a cover for a fiber optic cable connection.

BACKGROUND

Environmental conditions may play a not insubstantial role in a type of connector that is selected to connect cables. For example, where harsh, wet conditions are anticipated, an optical connector that is purchased in a pre-assembled state over-molded with a protective material may be selected. However, implementing such pre-assembled over-molded connectors requires the use of relatively expensive specialized cable assemblies.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a cover for a fiber optic cable connection is provided. The cover comprises a cap portion comprising a first housing portion having a first housing wall, a second housing portion having a second housing wall, and a coupler portion. The coupler portion is configured to couple the first housing portion and the second housing portion in a closed position. The first housing wall and the second housing wall define a housing opening. A sealing assembly is configured to be received within the housing opening and has an inner surface and an outer surface. The inner surface defines a compressible sealing opening configured to receive a fiber optic cable associated with the fiber optic cable connection. The outer surface is configured to contact at least one of the first housing wall or the second housing wall when the sealing assembly is compressed within the housing opening.

In an example, a cover for a fiber optic cable connection is provided. The cover comprises a cap portion comprising a first housing portion having a first housing wall, a second housing portion having a second housing wall, and a coupler portion having a coupler wall that defines a coupler opening. The coupler portion is configured to receive the first housing portion and the second housing portion within the coupler opening to couple the first housing portion and the second housing portion in a closed position. The first housing wall and the second housing wall define a housing opening. A sealing assembly is configured to be received within the housing opening and has an inner surface and an outer surface. The inner surface defines a compressible sealing opening configured to receive a fiber optic cable associated with the fiber optic cable connection. The outer surface is configured to contact at least one of the first housing wall or the second housing wall when the compressed sealing assembly is received within the housing opening.

In an example, a kit for covering a cable connection is provided. The kit comprises a cap portion comprising a first housing portion having a first housing wall, a second housing portion having a second housing wall, and a coupler portion configured to couple the first housing portion and the second housing portion in a closed position. The first housing wall and the second housing wall define a housing opening. A sealing assembly is configured to be received within the housing opening and has an inner surface and an outer surface. The inner surface defines a sealing opening configured to receive a cable associated with the cable connection. The outer surface is configured to contact at least one of the first housing wall or the second housing wall when the sealing assembly is received within the housing opening. A union portion configured to couple the cap portion to a second cap portion.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
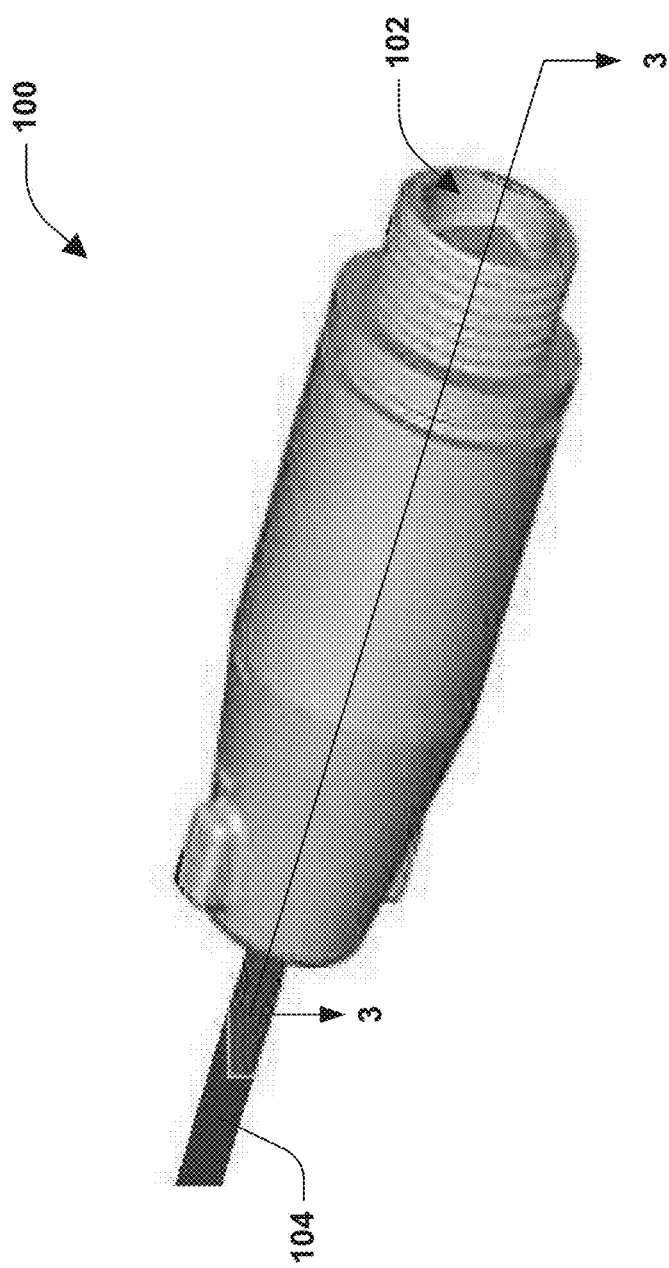
FIG. 1 is an illustration of an example cover for a fiber optic cable connection.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Referring to FIG. 1, a cover 100 for a fiber optic cable connection 102 is illustrated. The cover 100 can protect a fiber optic cable 104 with the fiber optic cable connection 102 from environmental effects. For example, the cover 100 can protect the fiber optic cable 104 from moisture (e.g., water, snow, liquids, etc.), contaminants (e.g., dust, dirt, etc.), inadvertent tampering, etc. In some examples, the cover 100 can assist in mechanically connecting two fiber optic cables together, so as to limit an inadvertent disconnect of the two fiber optic cables.

It will be appreciated that the fiber optic cable 104 may comprise a number of different structures, and is not limited to a cable. For example, the fiber optic cable 104 may comprise a rod, tube, other hollow structure, etc. In an example, a portion of the fiber optic cable 104 may be housed within a rod, tube, other hollow structure, etc.

Figure 2:
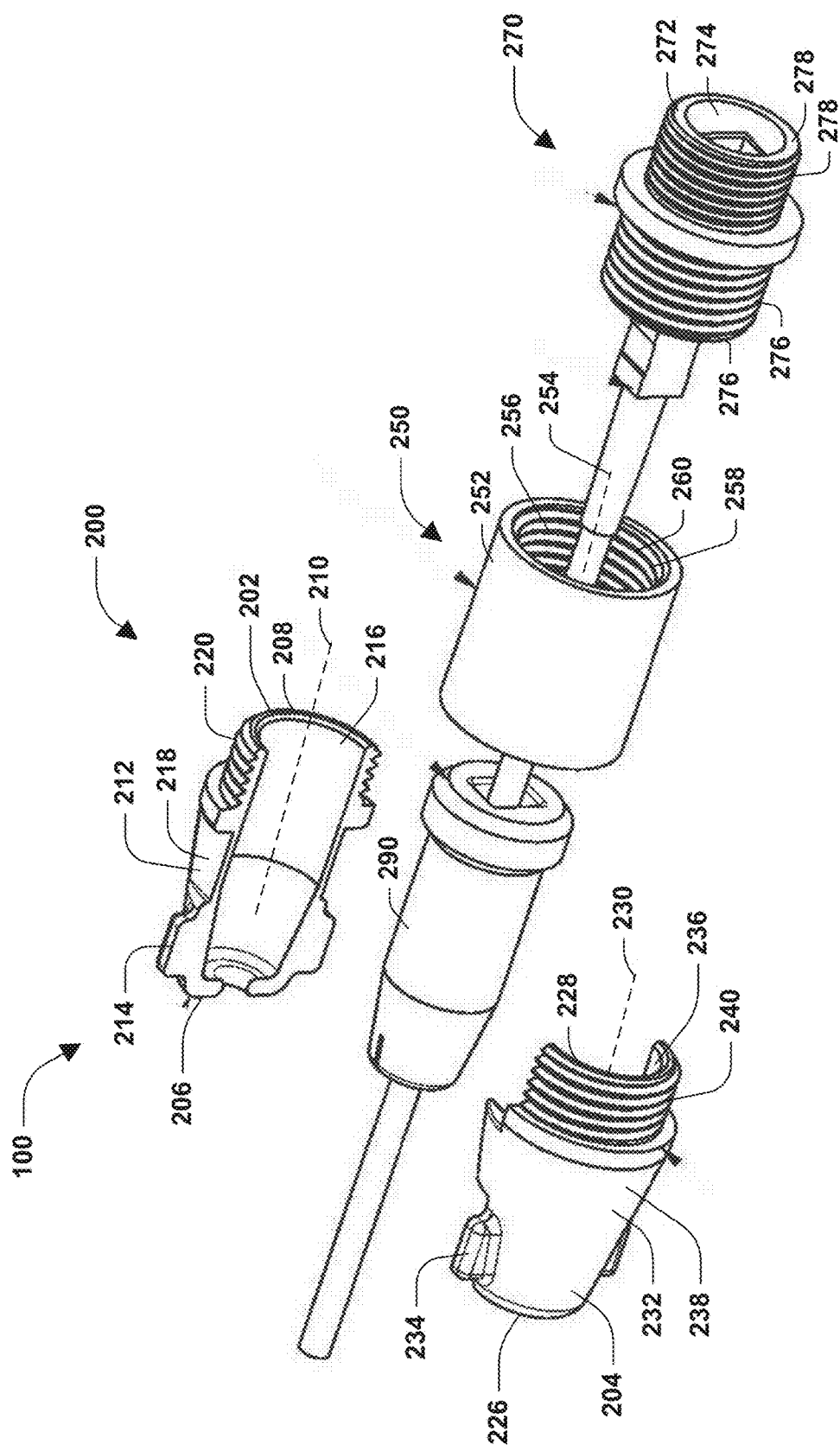
FIG. 2 is an illustration of a portion of an example cover for a fiber optic cable connection.

FIG. 2 illustrates a partially exploded illustration of the cover 100 for the fiber optic cable connection 102. In this example, the cover 100 comprises a cap portion 200. The cap portion 200 comprises a first housing portion 202 and a second housing portion 204. The first housing portion 202 and the second housing portion 204 are illustrated as being separated and in an opened position in the example of FIG. 2. However, in operation and when the cover 100 is fully assembled, the first housing portion 202 can engage and/or contact the second housing portion 204 so as to define a substantially enclosed volume, similar to the example illustrated in FIG. 1.

The first housing portion 202 extends between a first end 206 and a second end 208 along a first housing axis 210. The first housing portion 202 has a first housing wall 212 that defines a substantially rounded, half-circle cross-sectional shape. In other examples, the first housing wall 212 can define an oval shape, square or rectangular shape, etc. In these examples, the first housing wall 212 can have a rounded, circular, oval, rectangular, etc. shape so as to accommodate for portions of the fiber optic cable 104. In some examples, the first housing portion 202 comprises one or more gripping portions 214 to assist in gripping, manipulating, and/or holding the first housing portion 202.

The first housing wall 212 can have an inner surface 216 and an outer surface 218. In an example, the outer surface 218 can be at least partially threaded. For example, the outer surface 218 of the second end 208 of the first housing wall 212 can have a first threaded portion 220. In this example, the first threaded portion 220 can extend partially along a length of the first housing wall 212 along the first housing axis 210.

The second housing portion 204 extends between a first end 226 and a second end 228 along a second housing axis 230. The second housing portion 204 has a second housing wall 232 that defines a substantially rounded, half-circle cross-sectional shape. In other examples, the second housing wall 232 can define an oval shape, square or rectangular shape, etc. In these examples, the second housing wall 232 can have a rounded, circular, oval, rectangular, etc. shape so as to accommodate for portions of the fiber optic cable 104. In some examples, the second housing portion 204 comprises one or more gripping portions 234 to assist in gripping, manipulating, and/or holding the second housing portion 204. In this example, the second housing portion 204 may be a mirror image of the first housing portion 202, and may have a substantially matching shape.

The second housing wall 232 can have an inner surface 236 and an outer surface 238. In an example, the outer surface 238 can be at least partially threaded. For example, the outer surface 238 of the second end 228 of the second housing wall 232 can have a second threaded portion 240. In this example, the second threaded portion 240 can extend partially along a length of the second housing wall 232 along the second housing axis 230.

The cap portion 200 comprises a coupler portion 250 that is configured to couple the first housing portion 202 and the second housing portion 204 in a closed position. The coupler portion 250 has a coupler wall 252 that extends along a coupler axis 254. The coupler wall 252 can define a coupler opening 256 that can receive the second end 208 of the first housing portion 202 and the second end 228 of the second housing portion 204. An inner surface 258 of the coupler wall 252 can define a threaded coupler attachment portion 260. In an example, the threaded coupler attachment portion 260 can extend partially or completely along a length of the coupler portion 250 between opposing ends along the coupler axis 254. In an example, the threaded coupler attachment portion 260 can engage and mate with the first threaded portion 220 of the first housing wall 212 and the second threaded portion 240 of the second housing wall 232.

The cover 100 comprises a union portion 270. The union portion 270 has a union wall 272 that defines a union opening 274. In an example, the coupler portion 250 is configured to receive the union portion 270 within the coupler opening 256. The union portion 270 extends between a first mating end 276 and a second mating end 278. In an example, an outer surface of the first mating end 276 comprises a first threaded portion 280, and an outer surface of the second mating end 278 comprises a second threaded portion 282.

The cover 100 comprises a sealing assembly 290. The sealing assembly 290 is configured to be received within a housing opening defined within the first housing portion 202 and the second housing portion 204. The sealing assembly 290 comprises any number of materials that can facilitate a seal, such as rubber, elastomeric materials, polymeric materials, or the like. In an example, the sealing assembly 290 can receive the fiber optic cable 104 so as to form a seal with respect to the fiber optic cable 104. In addition, the sealing assembly 290 can contact and form a seal with the first housing portion 202 and the second housing portion 204.

Figure 3:
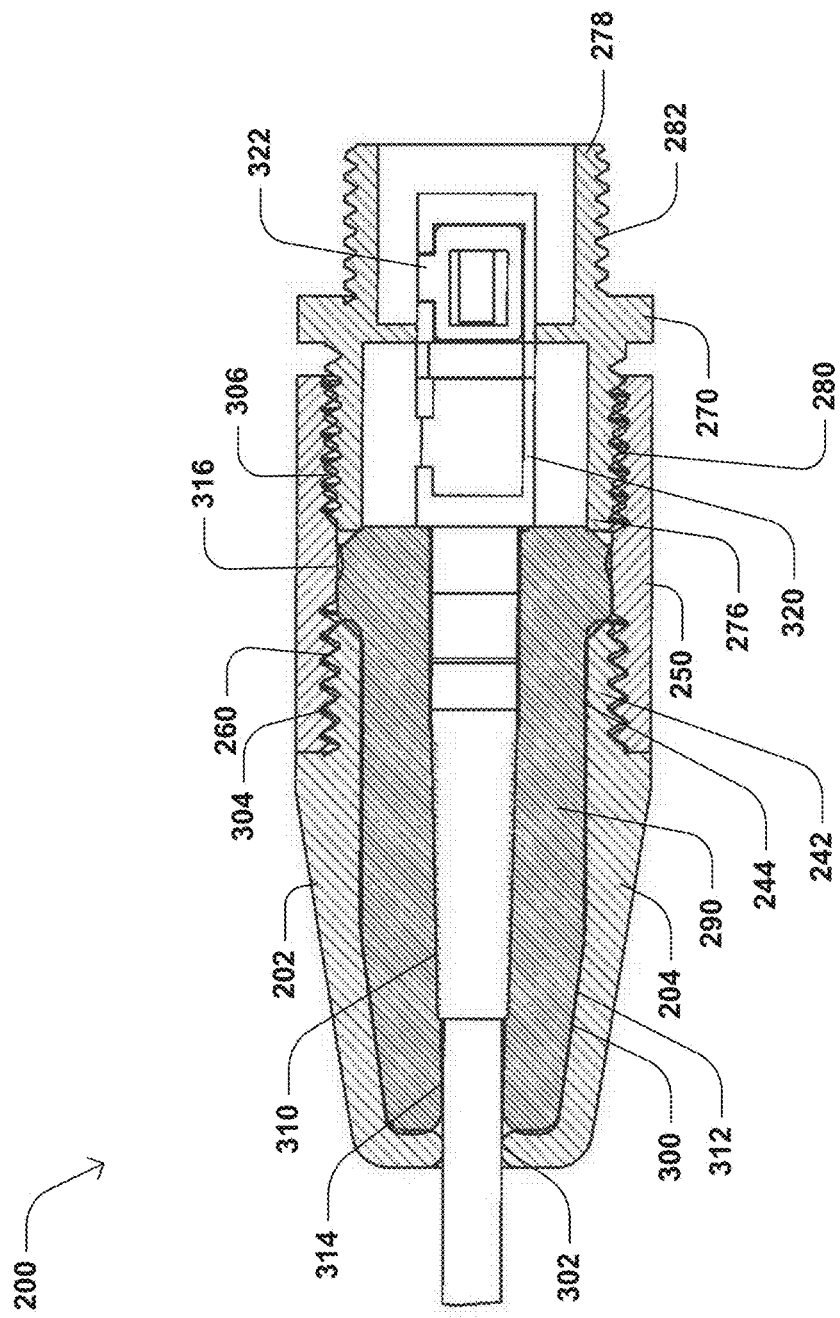
FIG. 3 is an illustration of a portion of an example cover for a fiber optic cable connection.

Turning to FIG. 3, a cross-sectional illustration of the cover 100 as viewed from the perspective indicated by 3-3 in FIG. 1 is illustrated. In this example, the cap portion 200 is in a closed position, such that the cover 100 can surround, encapsulate, protect, etc. the fiber optic cable 104. In an example, the first housing portion 202 and the second housing portion 204 can contact and engage each other, similar to the example illustrated in FIG. 1, such that the first housing portion 202 and the second housing are in the closed position, as illustrated. The first housing portion 202 and the second housing portion 204 can be axially aligned while contacting/engaging each other, such that the first end 206 of the first housing portion 202 is in alignment with the first end 226 of the second housing portion 204. Likewise, the second end 208 of the first housing portion 202 may be in alignment with the second end 228 of the second housing portion 204. In the closed position, the first housing wall 212 and the second housing wall 232 can define a housing opening 300. In addition, in the closed position, the first housing axis 210 is substantially parallel with respect to the second housing axis 230. In an example, the first housing portion 202 and the second housing portion 204 may extend co-axially with respect to each other.

When the first housing portion 202 and the second housing portion 204 are in the closed position, the first end 206 of the first housing portion 202 and the first end 226 of the second housing portion 204 define a first end opening 302 through which the fiber optic cable 104 extends. In an example, the first end opening 302 can have a cross-sectional size that substantially matches a cross-sectional size of the fiber optic cable 104. In such an example, due to the cross-sectional sizes of the first end opening 302 and the fiber optic cable 104 substantially matching, the fiber optic cable 104 may be in contact with the first housing wall 212 and the second housing wall 232 as the fiber optic cable 104 passes through the first end opening 302. By being in contact with the fiber optic cable 104, the first housing portion 202 and the second housing portion 204 can limit the ingress of moisture, contaminants, etc. through the first end opening 302.

When the first housing portion 202 and the second housing portion 204 are in the closed position, the second end 208 of the first housing portion 202 and the second end 228 of the second housing portion 204 can define a threaded attachment portion 304 (e.g., an attachment portion 304) configured to attach to the coupler portion 250. In this example, the threaded attachment portion 304 comprises the first threaded portion 220 of the first housing wall 212 and the second threaded portion 240 of the second housing wall 232. Together, the first threaded portion 220 and the second threaded portion 240 form the substantially continuous threaded attachment portion 304 around an outer surface of the first housing wall 212 and the second housing wall 232. In an example, the attachment portion 304 can have an attachment wall 242 that defines an attachment opening 244.

The coupler portion 250 can receive the first housing portion 202 and the second housing portion 204 within the coupler opening 256 to couple the first housing portion 202 and the second housing portion 204 in the closed position. In an example, when the coupler portion 250 does not couple the first housing portion 202 and the second housing portion 204, the first housing portion 202 is separable from the second housing portion 204, similar to the example illustrated in FIG. 2.

The threaded attachment portion 304 of the first housing portion 202 and the second housing portion 204 can engage the threaded coupler attachment portion 260 when the coupler portion 250 receives the first housing portion 202 and the second housing portion 204 within the coupler opening 256. Due to the threaded attachment portion 304 of the first housing portion 202 and the second housing portion 204 engaging the threaded coupler attachment portion 260 of the coupler portion 250, the coupler portion 250 is limited from being inadvertently removed from the first housing portion 202 and the second housing portion 204. Likewise, in an example, the engagement between the threaded coupler attachment portion 260 and the threaded attachment portion 304 can limit the ingress of moisture, contaminants, etc. through the attachment of the first housing portion 202 and the second housing portion 204, and the coupler portion 250.

In an example, the coupler portion 250 may comprise a second threaded coupler attachment portion 306. The second threaded coupler attachment portion 306 may be located at an opposite end of the coupler portion 250 from the threaded coupler attachment portion 260. In an example, the second threaded coupler attachment portion 306 may be spaced apart from the threaded coupler attachment portion 260 to define a gap, a space, or the like between the second threaded coupler attachment portion 306 and the threaded coupler attachment portion 306.

In an example, the coupler portion 250 is configured to receive the union portion 270 within the coupler opening 256. The first threaded portion 280 of the union portion 270 can engage and mate with the second threaded coupler attachment portion 306 of the coupler portion 250. Due to the first threaded portion 280 of the union portion 270 engaging and mating with the second threaded coupler attachment portion 306 of the coupler portion 250, the union portion 270 is limited from being inadvertently removed from the couple portion 250. Likewise, in an example, the engagement between the first threaded portion 280 and the second threaded coupler attachment portion 306 can limit the ingress of moisture, contaminants, etc. through the attachment of the coupler portion 250 and the union portion 270.

The sealing assembly 290 is configured to be received within the housing opening 300. In an example, the sealing assembly 290 has an inner surface 310 and an outer surface 312. The inner surface defines a sealing opening 314 that is configured to receive the fiber optic cable 104 associated with the fiber optic cable connection 102. The sealing assembly can form a seal with respect to the fiber optic cable 104. In an example, the outer surface 312 may be compressed against the first mating end 276 of the union portion 270. This compression can form a seal between the union portion 270 and the sealing assembly 290. As such, the ingress of moisture, contaminants, etc. between the sealing assembly 290 and the fiber optic cable 104 (e.g., from left to right in FIG. 3) is substantially limited.

The outer surface 312 of the sealing assembly 290 can contact at least one of the first housing wall 212 of the first housing portion 202 and/or the second housing wall 232 of the second housing portion 204 when the sealing assembly 290 is received within the housing opening 300. The sealing assembly 290 can form a seal with respect to the first housing wall 212 and the second housing wall 232.

In an example, the union portion 270 may be spaced a distance apart from the first housing portion 202 and the second housing portion 204 to define a space 316. A portion of the sealing assembly 290 can extend into this space 316. In such an example, the portion of the sealing assembly 290 that extends into the space 316 can contact the coupler portion 250 and/or the union portion 270 so as to form a seal and to limit the ingress of moisture, contaminants, etc.

In an example, the sealing assembly 290 can form a seal with the first mating end 276 of the union portion 270. This seal can be formed due to the union portion 270 being threaded into the coupler portion 250, which causes the sealing assembly 290 to contact/engage the first mating end 276 of the union portion 270. As a result, an ingress of fluid, moisture, etc. is substantially limited due to the seal between the first mating end 276 of the union portion 270 and the sealing assembly 290.

The fiber optic cable 104 may comprise a first fiber optic plug 320 that is located at an end of the fiber optic cable 104. The first fiber optic plug 320 may comprise a connector that terminates the end of an optical fiber. The first fiber optic plug 320 can be coupled (e.g., mechanically and electrically) to another fiber optic plug, so as to couple (e.g., mechanically and electrically) the fiber optic cable 104 and a second fiber optic cable. In this example, the first fiber optic plug 320 may be located within the cap portion 200 when the coupler portion 250 receives the first housing portion 202 and the second housing portion 204 within the coupler opening 256. In such an example, the sealing assembly 290 can be adjacent to, in contact with, and/or may form a seal with the first fiber optic plug 320 and/or the fiber optic cable 104 adjacent to the first fiber optic plug 320.

A second fiber optic plug 322 is located within the union opening 274 of the union portion 270. The second fiber optic plug 322 may comprise a connector that terminates the end of an optical fiber and/or may comprise a connector that connects two fiber optic cables and/or may comprise a connector that connects two fiber optic plugs of two fiber optic cables. The first fiber optic plug 320 and the second fiber optic plug 322 can be electrically connected when the coupler portion 250 receives the first housing portion 202 and the second housing portion 204 within the coupler opening 256 and when the coupler portion 250 receives the union portion 270 within the coupler opening 256.

Figure 4:
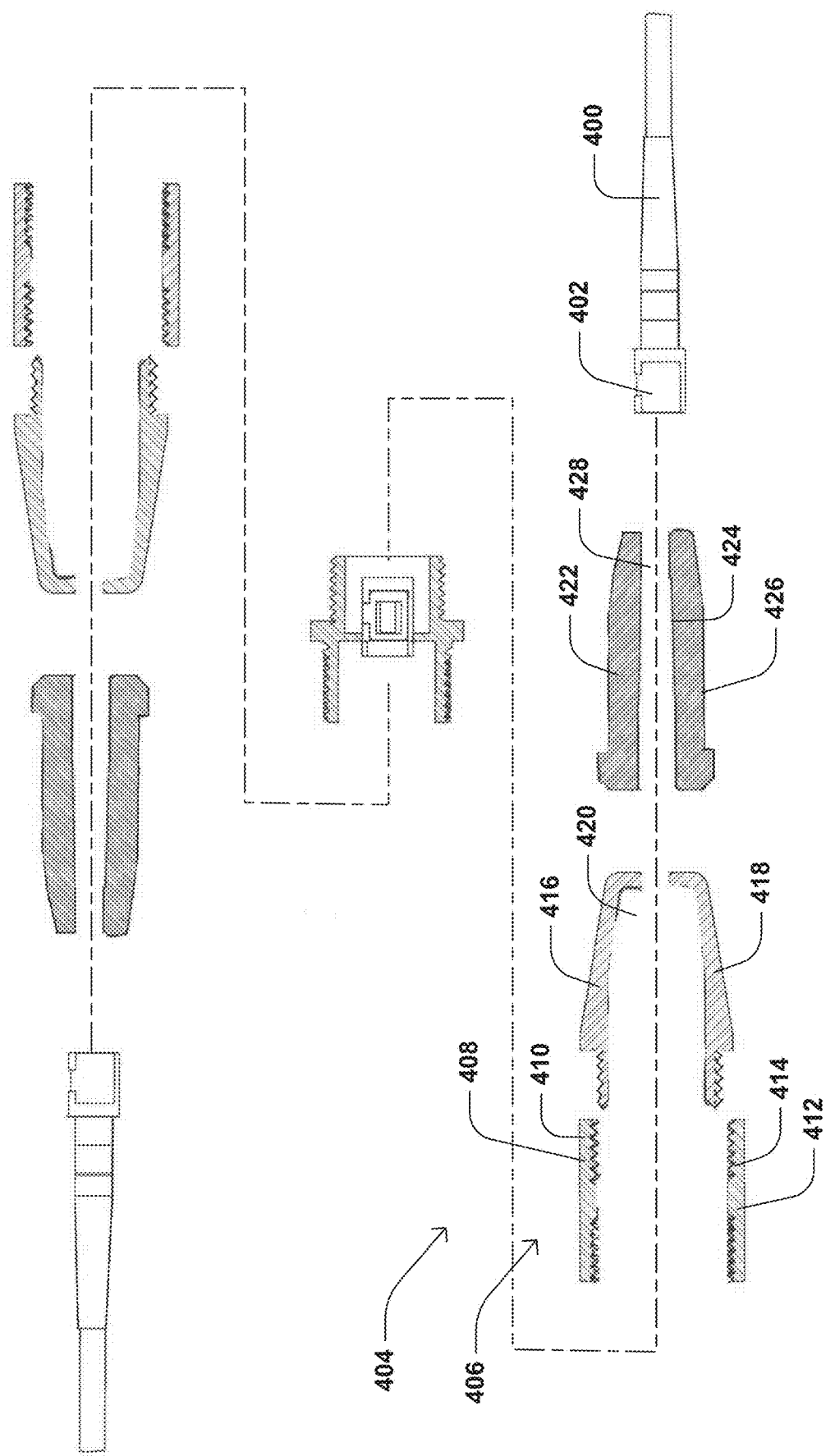
FIG. 4 is an illustration of a portion of an example cover for a fiber optic cable connection.

Referring to FIG. 4, an exploded illustration of the cover 100 is illustrated. In this example, a second fiber optic cable 400 can be electrically connected to the second fiber optic plug 322 and, thus, to the fiber optic cable 104. The second fiber optic cable 400 comprises a third fiber optic plug 402 that can be mechanically and electrically connected to the second fiber optic plug 322. The third fiber optic plug 402 may comprise a connector that terminates the end of the second fiber optic cable 400.

A second cover 404 can be provided for covering the second fiber optic cable 400 and the third fiber optic plug 402. In an example, the second cover 404 is substantially similar to the cover 100. For example, the second cover 404 comprises a third housing portion 408 and a fourth housing portion 412. The third housing portion 408 has a third housing wall 410 and the fourth housing portion 412 has a fourth housing wall 414.

The second cap portion 406 comprises a second coupler portion 416. The second coupler portion 416 has a second coupler wall 418 that defines a second coupler opening 420. The second coupler portion 416 is configured to receive the third housing portion 408 and the fourth housing portion 412 within the second coupler opening 420 to couple the third housing portion 408 and the fourth housing portion 412 in a closed position. In an example, the third housing wall 410 and the fourth housing wall 414 can define a second housing opening.

The second cover 404 comprises a second sealing assembly 422 having an inner surface 424 and an outer surface 426. The second sealing assembly 422 has a second sealing opening 428 that can receive the second fiber optic cable 400. The second sealing assembly 422 can form a seal with respect to the second fiber optic cable 400, the third housing portion 408, the fourth housing portion 412, the second coupler portion 416, and/or the union portion 270. In an example, the union portion 270 is configured to couple the coupler portion 250 and the second coupler portion 416. In an example, the coupler portion 250 is configured to receive a first end of the union portion 270 while the second coupler portion 416 is configured to receive a second end of the union portion 270.

In this example, the cover 100 and the second cover 404 can be attached to the fiber optic cable 104 and the second fiber optic cable 400, respectively. For example, the sealing assembly 290 can be inserted over the fiber optic cable 104, such that the fiber optic cable 104 and the first fiber optic plug 320 can be inserted through the sealing opening 314 of the sealing assembly 290. In an example, the sealing assembly 290 may have at least some degree of compressibility/flexibility, such that the sealing assembly 290 can receive the fiber optic cable 104 and the first fiber optic plug 320 through the sealing opening 314.

With the sealing assembly 290 receiving the fiber optic cable 104 and the first fiber optic plug 320, the cap portion 200 can be inserted over the sealing assembly 290. In such an example, the first housing portion 202 and the second housing portion 204 of the cap portion 200 can be moved from the opened position (e.g., as illustrated in FIG. 1) to the closed position (e.g., as illustrated in FIG. 2). In the closed position, the sealing assembly 290 can be received within the housing opening 300 defined by the first housing portion 202 and the second housing portion 204.

To maintain the first housing portion 202 and the second housing portion 204 in the closed position, the coupler portion 250 can receive the second ends of the first housing portion 202 and the second housing portion 204. In this example, the threaded attachment portion 304 of the first housing portion 202 and the second housing portion 204 can engage with the threaded coupler attachment portion 260 of the coupler portion 250.

The union portion 270 can be attached to the coupler portion 250. In an example, the second fiber optic plug 322 of the union portion 270 can be mated with the first fiber optic plug 320 of the fiber optic cable 104. Next, the coupler portion 250 can receive the union portion 270 within the coupler opening 256. In such an example, the first threaded portion 280 of the union portion 270 can engage and mate with the second threaded coupler attachment portion 306 of the coupler portion 250.

In a similar manner, the second cover 404 can be attached to the second fiber optic cable 400. For example, the second sealing assembly 422 can be positioned to receive the second fiber optic cable 400 and the third fiber optic plug 402 through the second sealing opening 428. Next, the third housing portion 408 and the fourth housing portion 412 can be coupled together so as to receive the second sealing assembly 422. The second coupler portion 416 can be coupled to the third housing portion 408 and the fourth housing portion 412. The third fiber optic plug 402 can be connected to the second fiber optic plug 322 of the union portion 270. The union portion 270 can then be connected to the second coupler portion 416.

Figure 5:
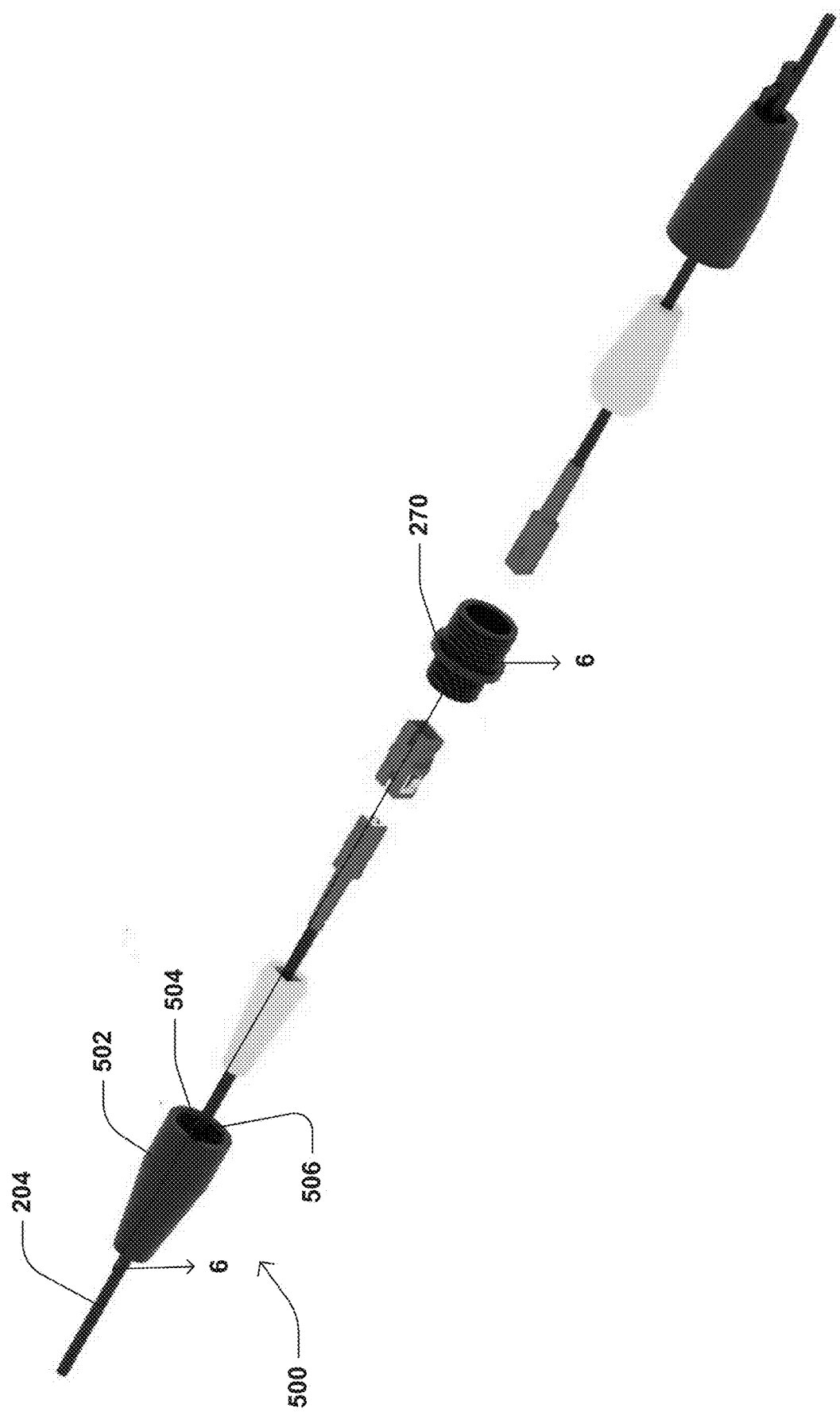
FIG. 5 is an illustration of a portion of an example cover for a fiber optic cable connection.

Turning to FIG. 5, a second example of the cover 100 and second cover 404 are illustrated. In this example, a cap portion 500 may comprise a single, unitary, one piece structure. The cap portion 500 can be inserted over the fiber optic cable 104, such that the cap portion 500 can receive the fiber optic cable 104, the first fiber optic plug 320, and the sealing assembly 290.

The cap portion 500 has a wall 502 that defines a housing opening 504. In an example, the housing opening 504 can receive the fiber optic cable 104, the first fiber optic plug 320, and the sealing assembly 290. The wall 502 of the cap portion 500 can comprise a threaded coupler attachment portion 506. The threaded coupler attachment portion 506 is located at an end of the cap portion 500 along an outer surface of the wall 502. In an example, the threaded coupler attachment portion 506 can engage and/or mate with the first threaded portion 280 at the first mating end 276 of the union portion 270. In this example, the second fiber optic plug 322 can be electrically connected to the first fiber optic plug 320 when the cap portion 500 is coupled to the union portion 270.

Figure 6:
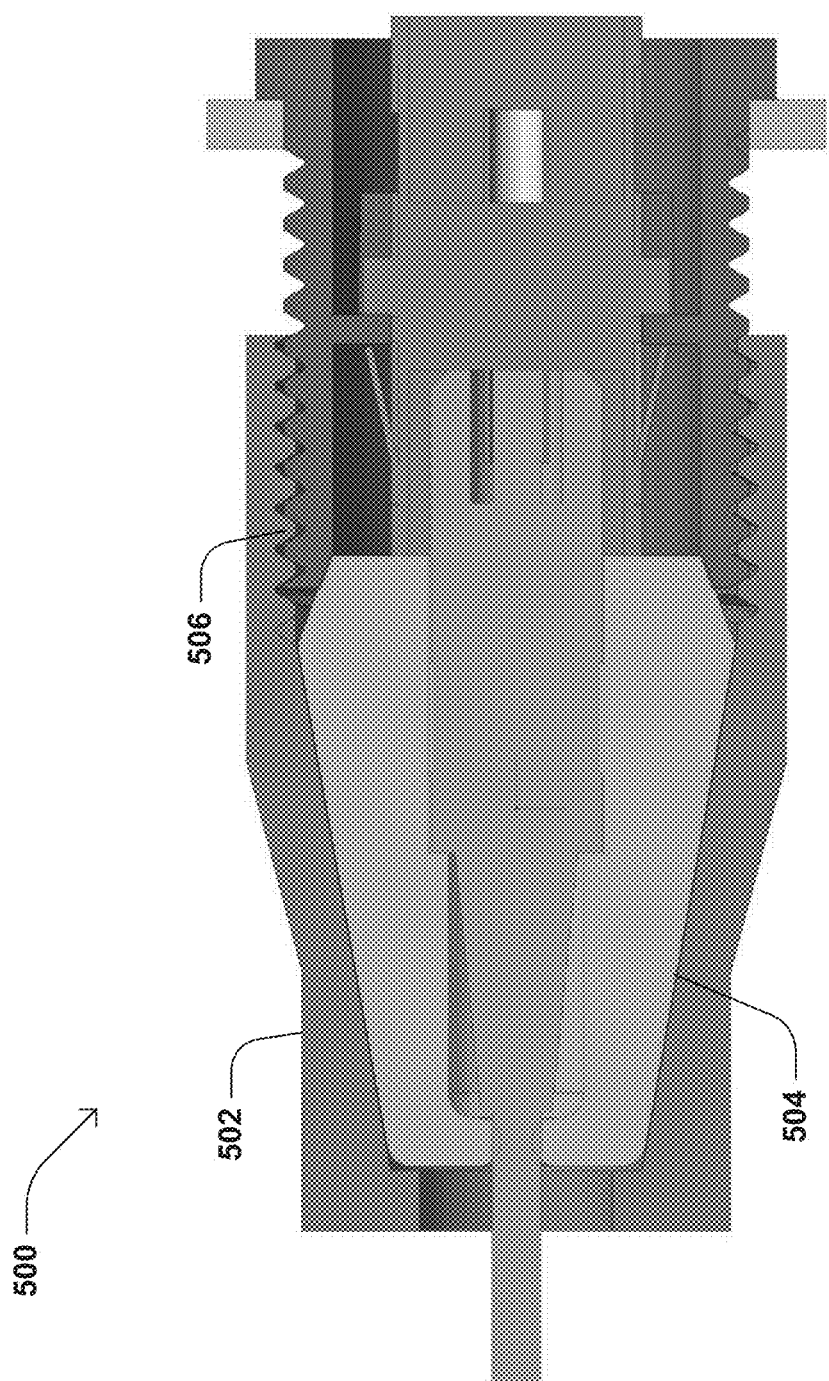
FIG. 6 is an illustration of an example cover for a fiber optic cable connection.

Turning to FIG. 6, a cross-sectional illustration of the cap portion 500 of the cover 100 as viewed from the perspective indicated by 6-6 in FIG. 5 is illustrated. In this example, the cap portion 500 can receive the fiber optic cable 104, the first fiber optic plug 320, and the sealing assembly 290 within the housing opening 504. In such an example, the sealing assembly 290 can form a seal with the fiber optic cable 104 along an inner surface of the sealing assembly 290. The sealing assembly 290 can form a seal with the wall 502 of the cap portion 500 along an outer surface of the sealing assembly 290. The union portion 270 can be coupled to the cap portion due to the threaded coupler attachment portion 506 engaging and/or mating with the first threaded portion 280 at the first mating end 276 of the union portion 270.

Figure 7:
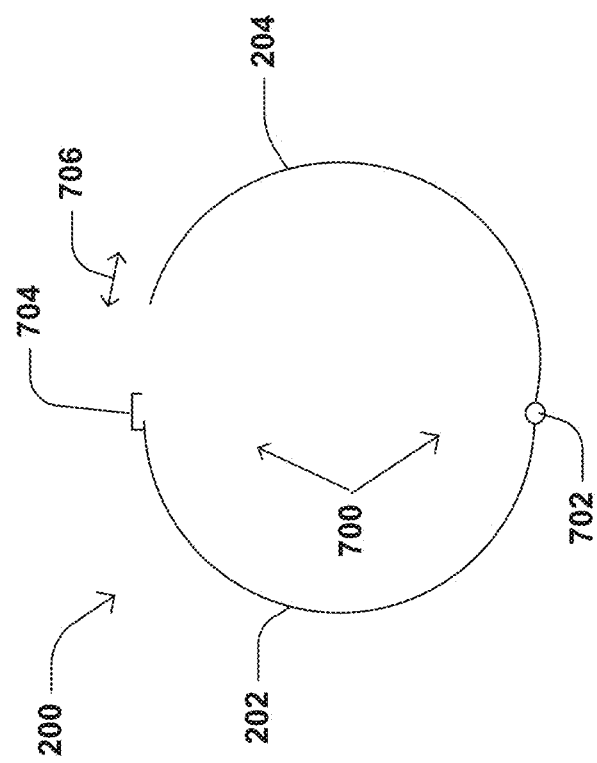
FIG. 7 is an illustration of an example cover for a fiber optic cable connection.

Turning to FIG. 7, a third example of the cap portion 200 is illustrated. In this example, the cap portion 200 comprises the first housing portion 202 and the second housing portion 204. The first housing portion 202 and the second housing portion 204 are not limited to being coupled by the coupler portion 250 illustrated in FIG. 2. Rather, a coupler portion 700 may be provided for coupling the first housing portion 202 and the second housing portion 204.

In this example, the coupler portion 700 comprises a first coupler device 702 and a second coupler device 704. The first coupler device 702 may comprise a hinge that movably attaches the first housing portion 202 and the second housing portion 204. For example, the first coupler device 702 can allow for the first housing portion 202 and the second housing portion 204 to be moved between an opened position, in which the fiber optic cable 104, sealing assembly 290, etc. can be inserted into the opening defined by the first housing portion 202 and the second housing portion 204, and a closed position.

Opposite the first coupler device 702 is the second coupler device 704. In this example, the second coupler device 704 may comprise any number of mechanical fastening structures that allow for the first housing portion 202 and the second housing portion 204 to be selectively attached together. In an example, the second coupler device 704 may comprise a latch located on one of the first housing portion 202 or the second housing portion 204. The latch can engage an opening defined within the other of the first housing portion 202 or the second housing portion 204. In such an example, the latch is configured to be removably inserted into the opening. When the latch is received within the opening, the second coupler device 704 can function to maintain the first housing portion 202 and the second housing portion 204 in the closed position. When the latch is not received within the opening, the first coupler device 702 can allow for the first housing portion 202 and the second housing portion 204 to rotate/move with respect to each other along a movement direction 706 between the opened position and the closed position.

Figure 8:
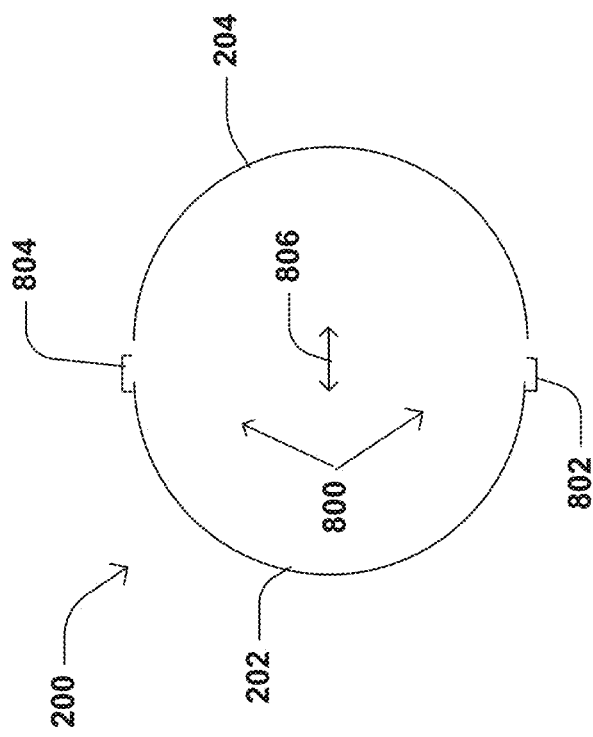
FIG. 8 is an illustration of an example cover for a fiber optic cable connection.

Turning to FIG. 8, a fourth example of the cap portion 200 is illustrated. In this example, the cap portion 200 comprises the first housing portion 202 and the second housing portion 204. In this example, a coupler portion 800 may be provided for coupling the first housing portion 202 and the second housing portion 204. The coupler portion 800 may comprise a first coupler device 802 and a second coupler device 804. The first coupler device 802 may comprise any number of mechanical fastening structures that allow for the first housing portion 202 and the second housing portion 204 to be selectively attached together. In an example, the first coupler device 802 may comprise a latch located on one of the first housing portion 202 or the second housing portion 204. The latch can engage an opening defined within the other of the first housing portion 202 or the second housing portion 204. In such an example, the latch is configured to be removably inserted into the opening.

The second coupler device 804 may comprise any number of mechanical fastening structures that allow for the first housing portion 202 and the second housing portion 204 to be selectively attached together. In an example, the second coupler device 804 may comprise a latch located on one of the first housing portion 202 or the second housing portion 204. The latch can engage an opening defined within the other of the first housing portion 202 or the second housing portion 204. In such an example, the latch is configured to be removably inserted into the opening.

When the latch of the first coupler device 802 is received within the opening, and when the latch of the second coupler device 804 is received within the other opening, the first coupler device 802 and the second coupler device can function to maintain the first housing portion 202 and the second housing portion 204 in the closed position. When the latch of the first coupler device 802 is not received within the opening, and when the latch of the second coupler device 804 is not received within the other opening, the first coupler device 802 and the second coupler device 804 can allow for the first housing portion 202 and the second housing portion 204 to move with respect to each other along a movement direction 806 between the opened position and the closed position.

As illustrated and described herein, a kit for covering a cable connection can be provided. The kit comprises the cap portion 200 having the first housing portion 202 having the first housing wall 212, and the second housing portion 204 having the second housing wall 232. The coupler portion 250, 700, 800 is configured to couple the first housing portion 202 and the second housing portion 204 in the closed position, wherein the first housing wall 212 and the second housing wall 232 define the housing opening 300.

The kit comprises the sealing assembly 290 that is configured to be received within the housing opening 300. The sealing assembly 290 has the inner surface 310 and the outer surface 312. The inner surface 310 defines the sealing opening 314 that is configured to receive the cable (e.g., the first fiber optic cable 104) associated with the cable connection 102. The outer surface 312 is configured to contact at least one of the first housing wall 212 or the second housing wall 214 when the sealing assembly 290 is received within the housing opening 300. The kit comprises the union portion 270 that is configured to couple the cap portion 200 to the second cap portion 406.

The cover 100 described herein is beneficial for a number of reasons. For example, the cover 100 can be provided for covering the fiber optic cable connection 102 (e.g., the fiber optic cable 104, the second fiber optic cable 400, etc.). A user can retrofit an existing fiber optic cable connection 102 with the cover 100. For example, the user can insert the sealing assembly 290 over the fiber optic cable 104. The cap portion 200 can then be placed over the sealing assembly 290. The union portion 270 can be coupled to the cap portion 200. In this example, the cover 100 can shield the fiber optic cable 104 from moisture (e.g., water, snow, liquids, etc.), contaminants (e.g., dust, dirt, etc.), inadvertent tampering, etc. In addition, the cover 100 can provide a stronger and more robust connection between the fiber optic plugs. That is, the first fiber optic plug 320 can be located within and fixed with respect to the cap portion 200 while the second fiber optic plug 322 can be located within and fixed with respect to the union portion 270. As such, due to the attachment between the cap portion 200 and the union portion 270, the likelihood of an inadvertent disconnection between the first fiber optic plug 320 and the second fiber optic plug 322 is reduced.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A cover for a fiber optic cable connection, the cover comprising:
    a cap portion comprising:
        a first housing portion having a first housing wall;
        a second housing portion having a second housing wall; and
        a coupler portion having a coupler wall, the coupler portion configured to couple the first housing portion and the second housing portion in a closed position wherein the first housing wall and the second housing wall define a housing opening; and
    a sealing assembly configured to be received within the housing opening and having an inner surface and an outer surface, the inner surface defining a sealing opening configured to receive a fiber optic cable associated with the fiber optic cable connection, the outer surface configured to contact an inner surface of the coupler wall and at least one of a first inner surface of the first housing wall or a second inner surface of the second housing wall when the sealing assembly is received within the housing opening.

2. The cover of claim 1, the first housing portion extending between a first end and a second end along a first housing axis, the second housing portion extending between a first end and a second end along a second housing axis.

3. The cover of claim 2, wherein when the first housing portion and the second housing portion are in the closed position, the first housing axis is substantially parallel with respect to the second housing axis.

4. The cover of claim 2, wherein when the first housing portion and the second housing portion are in the closed position, the first end of the first housing portion and the first end of the second housing portion define a first end opening through which the fiber optic cable extends.

5. The cover of claim 4, the first end opening having a cross-sectional size that substantially matches a cross-sectional size of the fiber optic cable.

6. The cover of claim 2, wherein when the first housing portion and the second housing portion are in the closed position, the second end of the first housing portion and the second end of the second housing portion define an attachment portion configured to attach to the coupler portion.

7. The cover of claim 6, wherein the coupler wall defines a coupler opening configured to receive the attachment portion to attach the first housing portion and the second housing portion to the coupler portion.

8. The cover of claim 6, the attachment portion having an attachment wall that comprises a threaded portion that is configured to mate with a coupler attachment portion of the coupler portion.

9. The cover of claim 1, wherein when the coupler portion does not couple the first housing portion and the second housing portion, the first housing portion is separable from the second housing portion.

10. A cover for a fiber optic cable connection, the cover comprising:
    a cap portion comprising:
        a first housing portion having a first housing wall;
        a second housing portion having a second housing wall; and
        a coupler portion having a coupler wall that defines a coupler opening, the coupler portion configured to receive the first housing portion and the second housing portion within the coupler opening to couple the first housing portion and the second housing portion in a closed position wherein the first housing wall and the second housing wall define a housing opening; and
    a sealing assembly configured to be received within the housing opening and having an inner surface and an outer surface, the inner surface defining a sealing opening configured to receive a fiber optic cable associated with the fiber optic cable connection, the outer surface configured to contact at least one of the first housing wall or the second housing wall when the sealing assembly is received within the housing opening, an inner surface of the coupler wall contacting the outer surface of the sealing assembly and at least one of a first outer surface of the first housing wall or a second outer surface of the second housing wall when the sealing assembly is received within the coupler opening.

11. The cover of claim 10, comprising a union portion having a union wall that defines a union opening, the coupler portion configured to receive the union portion within the coupler opening to couple the union portion and the coupler portion.

12. The cover of claim 11, comprising a first fiber optic plug located within the cap portion and configured to connect the fiber optic cable to the cap portion.

13. The cover of claim 12, comprising a second fiber optic plug located within the cap portion and configured to connect the fiber optic cable to a second fiber optic cable.

14. The cover of claim 13, the first fiber optic plug configured to connect to the second fiber optic plug when the union portion is coupled to the coupler portion.

15. The cover of claim 10, comprising:
   a second cap portion comprising:
      a third housing portion having a third housing wall;
      a fourth housing portion having a fourth housing wall; and
      a second coupler portion having a second coupler wall that defines a second coupler opening, the second coupler portion configured to receive the third housing portion and the fourth housing portion within the second coupler opening to couple the third housing portion and the fourth housing portion in a closed position wherein the third housing wall and the fourth housing wall define a second housing opening; and
      a second sealing assembly configured to be received within the second housing opening and having an inner surface and an outer surface, the inner surface defining a second sealing opening configured to receive a second fiber optic cable associated with the fiber optic cable connection, the outer surface configured to contact at least one of the third housing wall or the fourth housing wall when the second sealing assembly is received within the second housing opening.

16. The cover of claim 15, comprising a union portion configured to couple the coupler portion and the second coupler portion.

17. The cover of claim 16, the coupler portion configured to couple to a first end of the union portion, and the second coupler portion configured to couple to a second end of the union portion.

18. The cover of claim 10, the sealing assembly configured to form a seal with respect to the fiber optic cable.

19. The cover of claim 10, the sealing assembly configured to form a seal with respect to the first housing wall and the second housing wall.

20. A kit for covering a cable connection, the kit comprising:
   a cap portion comprising:
      a first housing portion having a first housing wall;
      a second housing portion having a second housing wall; and
      a coupler portion having a coupler wall that defines a coupler opening, the coupler portion configured to couple the first housing portion and the second housing portion in a closed position wherein the first housing wall and the second housing wall define a housing opening;
   a sealing assembly configured to be received within the housing opening and having an inner surface and an outer surface, the inner surface defining a sealing opening configured to receive a cable associated with the cable connection, the outer surface configured to contact at least one of the first housing wall or the second housing wall when the sealing assembly is received within the housing opening; and
   a union portion configured to couple the cap portion and a second cap portion, an outer union surface of the union portion engaging an inner coupler surface of the coupler portion to couple the union portion to the coupler portion, an inner surface of the coupler wall contacting the outer surface of the sealing assembly and at least one of a first outer surface of the first housing wall or a second outer surface of the second housing wall when a portion of the sealing assembly is received within the coupler opening.

* * * * *